May 25, 1926.
J. DON
1,586,185
WINDOW CLEANING APPARATUS
Filed June 21, 1923
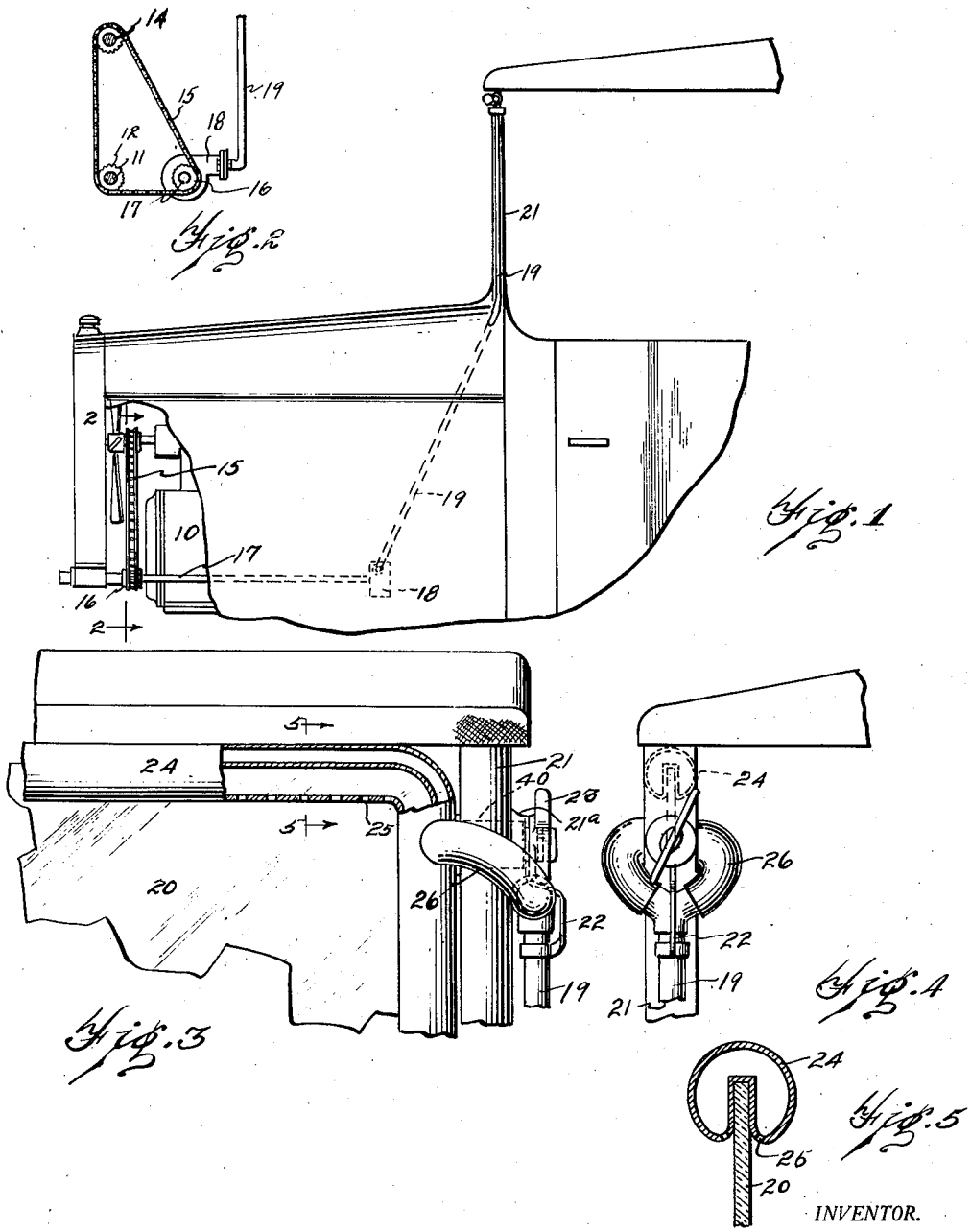
INVENTOR.
BY Jack Don
Ralzemond A. Parker
ATTORNEY.

Patented May 25, 1926.

1,586,185

UNITED STATES PATENT OFFICE.

JACK DON, OF DETROIT, MICHIGAN.

WINDOW-CLEANING APPARATUS.

Application filed June 21, 1923. Serial No. 646,748.

My invention relates to improvements in window cleaning apparatus and is particularly designed for use in connection with the windshield of a self propelled vehicle.

An object is to provide improved window cleaning apparatus intended to remove rain, snow, dirt, etcetera from the surface of the window and keep the same clear and free thereof and which makes use of currents of air directed over the surface of the window for such purpose.

An important feature is to provide in connection with the windshield of a motor vehicle, such apparatus driven by the motor of the vehicle, so constructed and arranged as to direct a blast of air over either or both surfaces of the window to keep the same clear.

The above and other objects together with details of construction, and method of operation will more fully appear from the following description of the illustrative embodiment of my invention shown in the accompanying drawings and defined in the appended claims.

In the drawings;

Fig. 1, is a side elevation of the forward end of a motor vehicle showing my invention applied thereto.

Fig. 2 is a cross sectional view taken on line 2—2 of Fig. 1.

Fig. 3 is a fragmentary front elevation, partly broken away, of a portion of the windshield showing one form of my invention attached thereto.

Fig. 4 is an end elevation of the construction illustrated in Fig. 3.

Fig. 5 is a cross sectional view taken on line 5—5 of Fig. 3.

Though my invention might be employed to maintain the surface of any window free and clear from rain or snow, I prefer to illustrate it in connection with the swinging windshield section of a motor vehicle as it is particularly desirable that the surface of such a window be kept free and clear.

In the drawings let 10 indicate the engine of a motor vehicle having a driven shaft 11, upon which is mounted a driving gear 12; a chain 15 driven by this gear 12 runs over the gear 16 carried by shaft 17 to drive an air blower 18. The air blower has a discharge conduit 19 which leads to a point adjacent the swinging windshield section 20 and is supported by the windshield standard 21 as appears in Figs. 1 and 3. The windshield section is supported for swinging movement by pivots 40 carried by the frame thereof, one of which pivots is shown in Fig. 3 and which extends through the standard 21 and the boss formed thereon indicated as 21ª. The pivot has a reduced threaded end adapted to receive the tightening nut 23.

In Fig. 3 a clamp 22 is mounted upon the adjustable thumb grip 23 to support the conduit 19 that leads from the air blower.

In the form of construction illustrated in Figs. 3 and 4 and 5, I have utilized a hollow frame member 24 which extends along one edge of the swinging windshield section 20. In the particular construction there shown, this hollow frame member 24 may be formed as appears from Fig. 5 of the drawing having each side perforated as at 25 to provide a plurality of discharge outlets disposed to direct jets of air over each surface of the window carried by such frame member.

This hollow frame member 24 communicates with conduit 19 by means of a T-shaped flexible connection 26 to receive air from the blower through conduit 19 to direct air currents over the surface of the window. Through the employment of a flexible connection such as rubber, it is possible to preserve the swinging feature of the pivotally supported windshield section 20. The construction just described is adapted to be built in the body of the motor vehicle.

In operation a current of air is generated by the blower or other generating mechanism and is directed through the outlet conduit 19 to the discharge nozzle 25 to throw a blast of air over the surface of the window to keep the same free from rain, snow, dirt or other obstructions.

What I claim is:—

1. In a motor vehicle, a windshield section pivotally supported between upright standards for swinging movement, said section provided with a hollow channel frame member extending along one edge, said frame member having hollow portions extending downwardly along said edge on each side thereof and provided with a plurality of air discharge openings disposed to project a multiplicity of air jets over each face of the windshield section, and air blast producing mechanism driven by the motor of the vehicle communicating with said hollow frame member to discharge thereinto.

2. In a motor vehicle, a windshield pane, a hollow channel frame member for the pane disposed along one edge thereof, said pane mounted within the channel of the frame member, said frame member having air discharge apertures on each side of the pane disposed linearly of the pane and extending substantially the length thereof, and an air blower driven by the motor of the vehicle having a discharge communicating with one end of said hollow frame member.

In testimony whereof, I sign this specification.

JACK DON.